(12) United States Patent
Cui et al.

(10) Patent No.: US 10,496,687 B2
(45) Date of Patent: Dec. 3, 2019

(54) INPUT METHOD, DEVICE, AND ELECTRONIC APPARATUS

(71) Applicant: BEIJING SOGOU TECHNOLOGY DEVELOPMENT CO., LTD., Beijing (CN)

(72) Inventors: Xin Cui, Beijing (CN); Shangkun Ren, Beijing (CN); Zheng Tang, Beijing (CN); Yang Zhang, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 247 days.

(21) Appl. No.: 15/521,299

(22) PCT Filed: Aug. 14, 2015

(86) PCT No.: PCT/CN2015/087050
§ 371 (c)(1),
(2) Date: Apr. 23, 2017

(87) PCT Pub. No.: WO2016/037519
PCT Pub. Date: Mar. 17, 2016

(65) Prior Publication Data
US 2017/0316086 A1     Nov. 2, 2017

(30) Foreign Application Priority Data
Sep. 9, 2014    (CN) .......................... 2014 1 0455924

(51) Int. Cl.
*G06F 16/30* (2019.01)
*G06F 16/33* (2019.01)
(Continued)

(52) U.S. Cl.
CPC ........ *G06F 16/3344* (2019.01); *G06F 3/0481* (2013.01); *G06F 16/338* (2019.01);
(Continued)

(58) Field of Classification Search
CPC ........... G06F 17/30684; G06F 17/2223; G06F 17/273; G06F 17/275; G06F 17/276;
(Continued)

(56) References Cited

U.S. PATENT DOCUMENTS 5,895,446 A * 4/1999 Takeda ................ G06F 17/2827
704/2
6,311,152 B1 * 10/2001 Bai ........................ G06F 17/277
704/251

(Continued)

FOREIGN PATENT DOCUMENTS

| CN | 101158969 A | 4/2008 |
| CN | 103869999 A | 6/2014 |
| CN | 104281649 A | 1/2015 |

OTHER PUBLICATIONS

CN101158969A—translation—Tencent Technology Shenzhen CO LTD (Year: 2008), 5 pages.*
(Continued)

*Primary Examiner* — Joshua Bullock
*Assistant Examiner* — Tiffany Thuy Bui
(74) *Attorney, Agent, or Firm* — Anova Law Group, PLLC

(57) ABSTRACT

An input method, device and electronic apparatus are provided. The input method includes acquiring text information at an input cursor position, where the text information includes above text information located before the input cursor and/or below text information located after the input cursor; extracting keywords from the text information; searching through associative candidate lexicons of the keywords to obtain an enter-on-screen candidate word queue at the input cursor position; outputting the enter-on-screen candidate word queue. By acquiring the text information at the input cursor position and determining the enter-on-screen candidate word queue based on the keywords in the (Continued)

text information, embodiments of the present disclosure solve the issue in existing techniques that after the input cursor changes it position, no enter-on-screen candidate word may be provided by association because no reliable enter-on-screen entry is obtained.

18 Claims, 6 Drawing Sheets

(51) Int. Cl.
 *G06N 20/00* (2019.01)
 *G06F 16/338* (2019.01)
 *G06F 16/332* (2019.01)
 *G06F 3/0481* (2013.01)
 *G06F 17/27* (2006.01)

(52) U.S. Cl.
 CPC ........ *G06F 16/3323* (2019.01); *G06F 17/275* (2013.01); *G06F 17/277* (2013.01); *G06N 20/00* (2019.01)

(58) Field of Classification Search
 CPC ............. G06F 17/277; G06F 17/30643; G06F 17/30696; G06F 3/018; G06F 3/0236; G06F 3/0237; G06F 3/0481; G06F 3/04812; G06F 16/3344; G06F 16/3323; G06F 16/338; G06N 20/00; G06N 99/005
 See application file for complete search history.

(56) References Cited

U.S. PATENT DOCUMENTS

| | | | |
|---|---|---|---|
| 8,321,802 B2* | 11/2012 | Rogers | G06F 3/04817 715/769 |
| 2002/0065647 A1* | 5/2002 | Hatori | G06F 17/275 704/2 |
| 2002/0174119 A1* | 11/2002 | Kummamuru | G06F 16/345 |
| 2004/0243394 A1* | 12/2004 | Kitamura | G06F 17/271 704/9 |
| 2008/0104056 A1* | 5/2008 | Li | G06Q 10/063 |
| 2008/0306728 A1* | 12/2008 | Kamatani | G06F 17/2818 704/7 |
| 2009/0055168 A1* | 2/2009 | Wu | G06F 17/2223 704/10 |
| 2011/0022952 A1* | 1/2011 | Wu | G06F 17/273 715/257 |
| 2012/0016671 A1* | 1/2012 | Jaggi | G10L 15/22 704/235 |
| 2014/0136970 A1* | 5/2014 | Xiao | G06F 17/24 715/271 |
| 2016/0275941 A1* | 9/2016 | Bellegarda | G10L 15/063 |

OTHER PUBLICATIONS

CN103869999A—translation—Baidu Internat Science and Technology Shenzen Co Ltd (Year: 2014), 15 pages.*
The World Intellectual Property Organization (WIPO) International Search Report for PCT/CN2015/087050 dated Oct. 28, 2015 2 Pages.

* cited by examiner

INPUT METHOD, DEVICE, AND ELECTRONIC APPARATUS

CROSS-REFERENCES TO RELATED APPLICATIONS

This application is a national phase entry under 35 U.S.C § 371 of International Application No. PCT/CN2015/087050, filed on Aug. 14, 2015, which claims priority of Chinese Patent Application No. 201410455924.0, entitled "INPUT METHOD, DEVICE, AND ELECTRONIC APPARATUS", filed with the State Intellectual Property Office of P. R. China on Sep. 9, 2014, the entire contents of all of which are incorporated herein by reference.

FIELD OF THE DISCLOSURE

The present disclosure generally relates to the field of communication technology and, more particularly, relates to an input method, a device, and an electronic apparatus.

BACKGROUND

Pinyin input method is one of the simplest Chinese character input methods. The development of the Pinyin input method is very fast. From the first generation that mainly relies on word input, that is, a user may each time input only one Chinese character, the Pinyin input method develops into the second generation that is characterized by phrase input and has an intelligent frequency-adjustment function. During this period of time, the Pinyin input method mainly relies on the dictionary of the input method. When the Pinyin input method develops into the third generation, the user may perform sentence input, sentences not included in the dictionary of the input method may also be inputted, and the word formation function has a great influence on the user input experience.

The association function of the input method is an extension of the active input function of the Pinyin input method. The establishment of the association function not only reduces the number of times of user active input and the number of times of key presses, but also improves the intellectuality of the input method. The implementation process of the input method includes first obtaining an entry lastly entered on screen by the user, then inquiring pre-built lexicons such as a system binary library according to the entry lastly entered on screen to obtain an enter-on-screen candidate word queue, and later outputting the enter-on-screen candidate word queue.

However, the enter-on-screen candidate word queue in the above-described input method has to rely on the entry lastly entered on screen. When an input cursor changes its position, no reliable enter-on-screen entry can be obtained, such that no enter-on-screen candidate word queue can be provided at the input cursor position via association. Accordingly, a technical issue to be solved urgently by those skilled in the art is: how to obtain a reliable enter-on-screen candidate word queue when the input cursor moves.

BRIEF SUMMARY OF THE DISCLOSURE

The technical issue to be solved by embodiments of the present disclosure is to provide an input method, thereby obtaining a reliable enter-on-screen candidate word queue when the input cursor moves.

Correspondingly, embodiments of the present disclosure also provide an input device and an electronic apparatus so as to ensure the implementation and application of the above-described method.

To solve the above-described issue, the present disclosure discloses an input method, including:

acquiring text information at an input cursor position, where the text information includes above text information located before the input cursor and/or below text information located after the input cursor;

extracting keywords from the text information;

searching through associative candidate lexicons of the keywords to obtain an enter-on-screen candidate word queue at the input cursor position; and outputting the enter-on-screen candidate word queue.

Further, acquiring the text information at the input cursor position includes:

when the input cursor is detected to be inside a text box and a stop duration of text input exceeds a time threshold, acquiring the text information at the input cursor position.

Further, acquiring the text information at the input cursor position includes:

using a break point of a whole sentence where the input cursor is located or a text box boundary as a length boundary of the text information, and acquiring the text information at the input cursor position.

Further, searching through the associative candidate lexicons of the keywords to obtain the enter-on-screen candidate word queue at the input cursor position includes:

according to a distance relationship between the keywords and the input cursor and/or an application property that each keyword belongs to, determining language models corresponding to the keywords; and searching through associative candidate lexicons of the language models to obtain the enter-on-screen candidate word queue at the input cursor position.

Further, according to the distance relationship between the keywords and the input cursor, determining the language models corresponding to the keywords includes:

if the number of the keywords is one, when the distance relationship between the keyword and the input cursor is an adjacent relationship, determining the language model corresponding to the keyword to be an adjacent binary language model; when the distance relationship is a non-adjacent relationship, determining the language model corresponding to the keyword to be a remote binary language model;

if the number of the keywords is two, determining the language model corresponding to the keywords to be a ternary language model.

Further, before according to the distance relationship between the keywords and the input cursor, determining the language models corresponding to the keywords, the input method further includes:

establishing language models and associative candidate lexicons of the language models, where the language models include the adjacent binary language model, the remote binary language model and the ternary language model; and establishing the language models and the associative candidate lexicons of the language models includes:

collecting a training corpus;

extracting a training candidate word and training keywords from the training corpus, where the distance relationships between the training keywords and the training candidate word include an adjacent relationship and a non-adjacent relationship, and the number of the training keywords is at least one; and performing model training on the training candidate word and the training keywords to obtain the language models and the associative candidate lexicons of the language models.

Further, according to the application property that each keyword belongs to, determining the language models corresponding to the keywords includes:

according to a user usage habitat feature that the keyword belongs to, determining a user model corresponding to the keyword; or according to an application field that the keyword belongs to, determining a perpendicular model corresponding to the keyword; or according to a common vocabulary that the keyword belongs to, determining a common vocabulary language model corresponding to the keyword; or according to a topic situation that the keyword belongs to, determining a situation model corresponding to the keyword.

Further, searching through the associative candidate lexicons of the language models to obtain the enter-on-screen candidate word queue at the input cursor position includes:

when the number of the language models is at least two, determining an enter-on-screen candidate word in the associative candidate lexicon of each language model, respectively;

according to a pre-determined weight of each language model, linearly superimposing and merging the enter-on-screen candidate words based on the weights; and sorting the merged enter-on-screen candidate words based on the weights from high to low to obtain the enter-on-screen candidate word queue at the input cursor position.

Further, before outputting the enter-on-screen candidate word queue, the input method also includes:

according to the topic situation at the input cursor position, re-ordering the enter-on-screen candidate word queue;

outputting the enter-on-screen candidate word queue includes:

outputting a re-ordered enter-on-screen candidate word queue.

Further, according to the topic situation at the input cursor position, re-ordering the enter-on-screen candidate word queue, includes:

according to the number of the keywords that fit each situation feature tag and the sum of possibilities of the keywords fitting each situation feature tag, determining a feature score of each situation feature tag;

according to the feature score of each situation feature tag, sorting the situation feature tags from high to low; and according to an order of the situation feature tags, re-ordering the enter-on-screen candidate word queue, where the enter-on-screen candidate words in the enter-on-screen candidate word queue all have each own situation feature tag.

The present disclosure also discloses an input device, including:

a text acquisition unit, configured to acquire text information at an input cursor position, where the text information includes above text information before an input cursor and/or below text information after the input cursor;

a keyword extraction unit, configured to extract keywords from the text information;

a queue acquisition unit, configured to search through associative candidate lexicons of the keywords to obtain an enter-on-screen candidate word queue at the input cursor position; and a queue output unit, configured to output the enter-on-screen candidate word queue.

Further, the text acquisition unit is specifically configured to, when the input cursor is detected to be inside a text box and a stop duration of text input exceeds a time threshold, acquire the text information at the input cursor position.

Further, the text acquisition unit is specifically configured to, using a break point of a whole sentence where the input cursor is located or a text box boundary as a length boundary of the text information, acquire the text information at the input cursor position.

Further, the queue acquisition unit includes:

a model determination sub-unit, configured to, according to a distance relationship between the keywords and the input cursor and/or an application property that each keyword belongs to, determine language models corresponding to the keywords; and a queue acquisition sub-unit, configured to search through associative candidate lexicons of the language models to obtain the enter-on-screen candidate word queue at the input cursor position.

Further, the model determination sub-unit is specifically configured to, if the number of the keywords is one, when the distance relationship between the keyword and the input cursor is an adjacent relationship, determine the language model corresponding to the keyword to be an adjacent binary language model; when the distance relationship is a non-adjacent relationship, determine the language model corresponding to the keyword to be a remote binary language model; and if the number of keywords are two, determine the language model corresponding to the keywords to be a ternary language model.

Further, the queue acquisition unit further includes:

a model establishment sub-unit, configured to, before the model determination sub-unit determines the language models corresponding to the keywords, establish the language models and the associative candidate lexicons of the language models, where the language models include the adjacent binary language model, the remote binary language model, and the ternary language model;

the model establishment sub-unit includes:

a collection sub-unit, configured to collect a training corpus;

an extraction sub-unit, configured to extract a training candidate word and training keywords from the training corpus, where the distance relationship between the training keywords and the training candidate word includes an adjacent relationship and a non-adjacent relationship, and the number of the training keywords is at least one; and a training sub-unit, configured to perform model training on the training candidate word and the training keywords to obtain the language models and the associative candidate lexicons of the language models.

Further, the model determination sub-unit is specifically configured to, according to an user usage habitat feature that the keyword belongs to, determine an use model corresponding to the keyword; or, according to an application field that the keyword belongs to, determine a perpendicular model corresponding to the keyword; or, according to a common vocabulary that the keyword belongs to, determine a common vocabulary language model corresponding to the keyword; or, according to a topic situation that the keyword belongs to, determine a situation model corresponding to the keyword.

Further, the queue acquisition sub-unit includes:

a determination sub-unit, configured to when the number of language models is at least two, determine an enter-on-screen candidate word in the associative candidate lexicon of each language model, respectively;

a merging sub-unit, configured to, according to a predetermined weight of each language model, linearly superimpose and merge the enter-on-screen candidate words based on the weights; and a sorting sub-unit, configured to sort the merged enter-on-screen candidate words based on the weights from high to low to obtain the enter-on-screen candidate word queue at the input cursor position.

Further, the device further includes:

a queue re-ordering unit, configured to before the queue output unit outputs the enter-on-screen candidate word queue, according to the topic situation at the input cursor position, re-order the enter-on-screen candidate word queue;

the queue output unit, configured to output a re-ordered enter-on-screen candidate word queue.

Further, the queue re-ordering unit includes:

a score calculating sub-unit, configured to according to the number of the keywords that fit each situation feature tag and the sum of possibilities of the keywords fitting each situation feature tag, determine a feature score of each situation feature tag;

a situation sorting sub-unit, configured to according to the feature score of each situation feature tag, sort the situation feature tags from high to low; and a re-ordering sub-unit, configured to according to an order of the situation feature tags, re-order the enter-on-screen candidate word queue, where the enter-on-screen candidate words in the enter-on-screen candidate word queue all have each own situation feature tag.

The present disclosure also discloses an electronic apparatus including a memory and a processor. The memory is configured to store computer instructions or codes, and the processor is coupled to the memory and configured to execute the computer instructions or codes in the memory, thereby implementing the following method:

acquiring text information at an input cursor position, the text information includes above text information before the input cursor and/or below text information after the input cursor;

extracting keywords from the text information;

searching through associative candidate lexicons of the keywords to obtain an enter-on-screen candidate word queue at the input cursor position; and outputting the enter-on-screen candidate word queue.

The present disclosure also discloses a computer program including computer-readable codes, when the computer-readable codes are run in a mobile terminal, the mobile terminal may execute the above-described input method.

The present disclosure also discloses a computer-readable medium, where the above-described computer program is stored.

Compared to existing technologies, embodiments of the present disclosure include at least the following advantages:

By acquiring the text information at the input cursor position and determining the enter-on-screen candidate word queue based on the keywords in the text information, embodiments of the present disclosure may solve the issue in existing technologies that after the input cursor changes its position, no enter-on-screen candidate word may be provided by association because no reliable enter-on-screen entry is obtained. The disclosed method not only obtains reliable enter-on-screen candidate words when the input cursor moves. Further, instead of simply relying on the entry lastly entered on screen to provide the enter-on-screen candidate word queue via association, the input method may utilize the text information before and after the input cursor as well as remote text information to provide the enter-on-screen candidate word queue via association. The method may more fully and correctly understand the input intention of the user, thereby providing a more reliable enter-on-screen candidate word queue.

DETAILED DESCRIPTION

To make the above-mentioned object, features and advantages more apparent and easier to understand, hereinafter, the present disclosure will be made in detail with reference to the accompanying drawings and specific embodiments.

Figure 1:
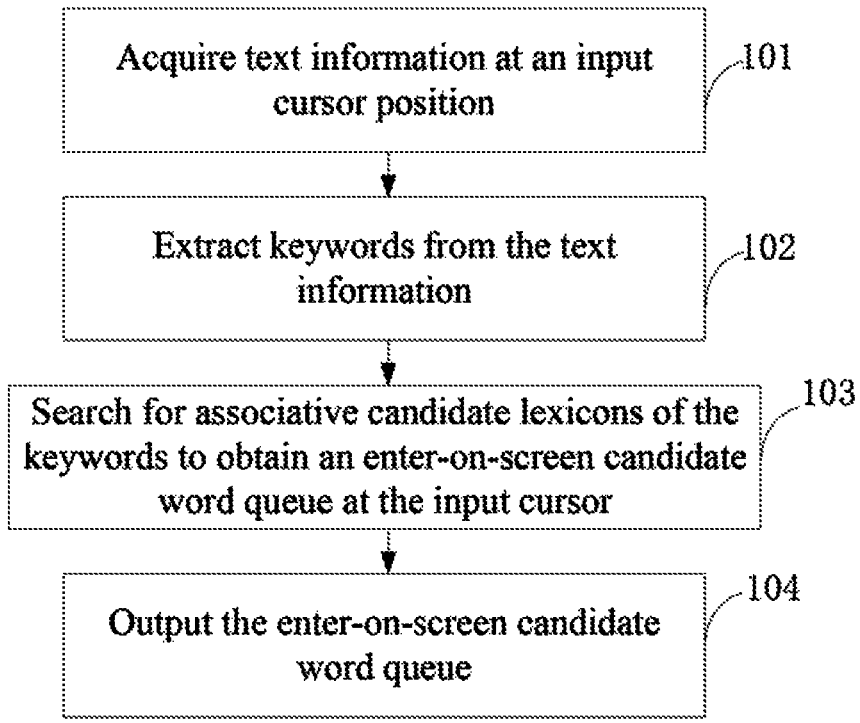
FIG. 1 illustrates a flow diagram of an input method in embodiments of the present disclosure.

Referring to FIG. 1, a flow diagram of an input method in embodiments of the present disclosure is provided.

A process where a user performs text input may be implemented by directly using a method described in embodiments of the present disclosure, or by integrating an existing method that predicts an enter-on-screen candidate word based on an entry lastly entered on screen to give an enter-on-screen candidate word queue at an input cursor position. The process may also be implemented by a method that executes embodiments of the present disclosure under certain conditions. Specifically, when an input device detects that the input cursor is inside a text box and a stop duration of text input exceeds a time threshold, according to the disclosed method, an enter-on-screen candidate word queue at the input cursor position may be provided. For example, when a user changes a position of the input cursor in the text box to modify or add text information, the input cursor may remain inside the text box under the given circumstance, and the text input may be paused. The method may include the following steps.

Step 101: text information at the input cursor position is acquired.

In the present step, the input device first reads the text information at the input cursor position via a system API interface, and may use a break point of a whole sentence where the input cursor is located or a text box boundary as a length boundary of the text information.

In particular, the text information may include above text information located before the input cursor, or below text information located after the input cursor. Obviously, if text information exists both before and after the input cursor, the above text information and the below text information may be acquired simultaneously.

Step 102: keywords are extracted from the text information.

In one embodiment, a keyword primary word table may be pre-configured. The keyword primary word table is a set including entries that may be used as keywords. It may be agreed that all entries found in the keyword primary word table can be used as keywords, and entries not included in the keyword primary word table are not used as keywords.

In the present step, all entries in the text information that belong to the keyword primary word table may be extracted as keywords. Specifically, for the above text information, starting from the input cursor position, keywords in the above text information may be traversed forwards till a break point of a whole sentence or a text box boundary using a dynamic planning algorithm. For the below text information, starting from the input cursor position, the keywords in the below text information may be traversed backwards to a break point of the whole sentence or the text box boundary using the dynamic planning algorithm. The keywords in the above text information and the keywords in the below text information may be stored in different sets, respectively, or may be distinguished and annotated, such that the subsequent search of enter-on-screen candidate word may become more convenient. Specific descriptions are provided in subsequent embodiments.

The number of the keywords extracted from the text information according to the above-described method may be one or more. The keywords may all be located in the above text information. The keywords may also all be located in the below text information. Or, the keywords may be both located in the above text information and the below text information.

Step 103: associative candidate lexicons of the keywords are searched through to obtain the enter-on-screen candidate word queue at the input cursor position.

After obtaining the keywords of the text information, corresponding associative candidate lexicons may be searched through according to the keywords, thereby obtaining the enter-on-screen candidate word queue at the input cursor position.

In one method, each keyword may correspond to one associative candidate lexicon, and the enter-on-screen candidate words in each associative candidate lexicon may be sorted according to the usage probability from high to low. When inquiring the associative candidate lexicons of a plurality of keywords, repeated enter-on-screen candidate words may be highly likely found, and the enter-on-screen candidate words from each lexicon may be sorted according to the repetition rate from high to low, thereby obtaining the enter-on-screen candidate word queue at the input cursor position.

In another method, language models and associative candidate lexicons of the language models may be pre-established. The language models may be established based on a plurality of distance relationships between the keywords and the input cursor, or may be established based on an application property that each keyword belongs to. In particular, the application property may be the user usage habit of the keyword, or the application field that the keyword belongs to, such as time, geological location, and holiday wish, etc. The application property may also be the common vocabulary that the keyword belongs to, or the topic situation that the keyword belongs to, etc. When executing the present step, only one language model corresponding to the keywords extracted in the previous step (Step 102) may be determined, and the enter-on-screen candidate word queue at the input cursor position may be obtained according to the associative candidate lexicon of the determined language model. Or, a plurality of language models corresponding to the extracted keywords may be determined, and the associative candidate lexicons of the plurality of language models may be merged to eventually determine the enter-on-screen candidate word queue at the input cursor position. Specific examples are provided hereinafter with reference to descriptions of subsequent embodiments.

Obviously, other methods may also exist, which are not described in detail herein.

Step 104: the enter-on-screen candidate word queue is outputted.

After obtaining the enter-on-screen candidate word queue, the enter-on-screen candidate word queue may be outputted directly for the user to select. Or, the enter-on-screen candidate word queue may be first re-ordered, and the re-ordered enter-on-screen candidate word queue may be outputted. A plurality of re-ordering methods may be available.

By acquiring the text information at the input cursor position and determining the enter-on-screen candidate word queue based on the keywords in the text information, embodiments of the present disclosure may solve the issue in existing technologies that after the input cursor changes its position, no enter-on-screen candidate word may be provided by association because no reliable enter-on-screen entry is obtained. The disclosed method not only obtains reliable enter-on-screen candidate words when the input cursor moves. Further, instead of simply relying on the entry lastly entered on screen to provide the enter-on-screen candidate word queue via association, the input method may utilize the text information before and after the input cursor as well as the remote text information to provide the enter-on-screen candidate word queue via association. The method may more fully and correctly understand the input intention of the user, thereby providing more reliable enter-on-screen candidate word queue.

Figure 2:
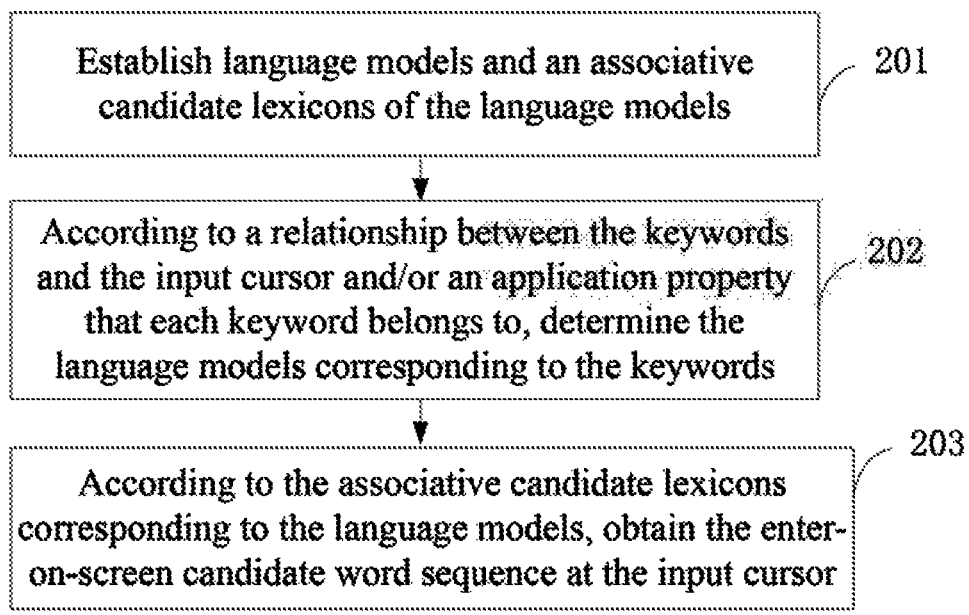
FIG. 2 illustrates a flow chart of a method for acquiring an enter-on-screen candidate word queue at an input cursor position in embodiments of the present disclosure.

In another embodiment of the present disclosure, as described previously, when executing Step 103 to search through the associative candidate lexicons of the keywords and obtain the enter-on-screen candidate word queue at the input cursor position, one method illustrated in FIG. 2 may be used, which includes the following steps.

Step 201: a language model and an associative candidate lexicon of the language model are established.

First, the present step no longer needs to be repeatedly executed each time an enter-on-screen candidate word queue at the input cursor position is obtained, and may only be executed once at an initial moment A plurality of language models may be established in the present step. In one embodiment, the plurality of language models may include a system model, a user model, a perpendicular model, a common vocabulary language model, and a situation model.

The system model is a language model established based on the distance relationship between the keyword(s) and the input cursor. The user model, the perpendicular model, the common vocabulary language model, and the situation model are language models established based on the application property that the keyword belongs to. In particular, the user model is a model established based on the user usage habit of the keyword, and the perpendicular model is a model established based on the application field that the keyword belongs to, such as time, geological location, and holiday wish, etc. The common vocabulary language model is a model established based on the common vocabulary that the keyword belongs to, and the situation model is a model established based on the topic situation that the keyword belongs to. Hereinafter, each model is introduced, respectively.

Figure 3:
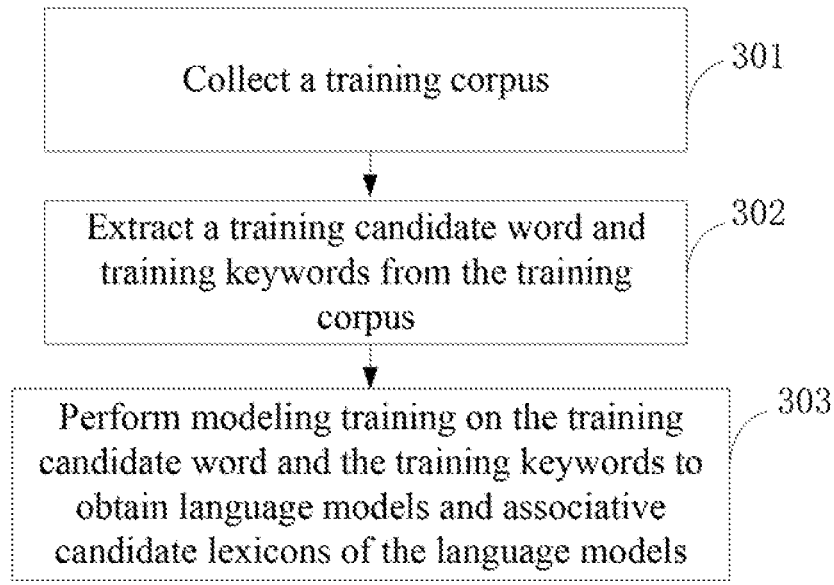
FIG. 3 illustrates a flow chart of a method for establishing a language model and an associative candidate lexicon of the language model in embodiments of the present disclosure.

1) The system model includes an adjacent binary language model, a remote binary language model, and a ternary language model. The establishment process of the system model and an associative candidate lexicon of the system model is illustrated in FIG. 3, which includes:

Step 301: receiving a training corpus; and

Step 302: extracting a training candidate word and training keywords from the training corpus.

For each training corpus, keywords are extracted according to the keyword primary word table and used as the training keywords, and an entry in a certain location of the training corpus is used as the training candidate word. In particular, to obtain different system models after training, the distance relationship between the training keywords and the training candidate word needs to include an adjacent relationship and a non-adjacent relationship, and the number of the training keywords needs to be at least one.

In particular, the adjacent relationship may refer to a relationship where no intervals or only stopwords exist between the training keyword and the training candidate word, and the non-adjacent relationship is just the opposite. The stopwords refer to words or phrases that assist the expression of the user, such as modal particles of "哈 (meaning 'ah', etc.)", "了 (pinyin input 'le', a common auxiliary in Chinese typically used to indicate action completion or change of state)", and "嗯 (meaning 'hmm' or 'yup', etc.)", etc.

Further, in Step 303, model training is performed on the training candidate word and the training keywords to obtain the language models and the corresponding associative candidate lexicons.

The process of the model training is similar to the training process of the adjacent binary language model in existing technologies, which is not repeatedly described here.

After model training, the adjacent binary language model, the remote binary language model, the ternary language model, and the associative candidate lexicons of each language model may be obtained.

In particular, the adjacent binary language model is configured to solve the binary relationship between the adjacent keyword and the enter-on-screen candidate word. The adjacent relationship may be a relationship between a keyword in the above text information and the enter-on-screen candidate word, or a relationship between the enter-on-screen candidate word and a keyword in the below text information. For example, in "举行~晚宴 ('hold~dinner party' in Chinese)", "举行 (hold)" is the enter-on-screen candidate word, and "晚宴 (dinner party)" is the keyword in the below text information. The adjacent binary language model is a language model with a relatively high certainty. The drawback of the adjacent binary language model is that the amount of information is relatively small and the number of candidates that can be predicted is too large. Accordingly, it is difficult for the user to select what he or she wants.

The remote binary language model is configured to solve the binary relationship between the keyword and the enter-on-screen candidate word showing a non-adjacent relationship (i.e., the remote relationship). The remote relationship may be a relationship between a keyword in the above text information and the enter-on-screen candidate word, or may be a relationship between the enter-on-screen candidate word and a keyword in the below text information. Different from the adjacent binary language model, the remote binary language model does not require the two primary words to be adjacent, such as a keyword "苹果 ('apple' in Chinese)" and an enter-on-screen word "梨 ('pear' in Chinese)". The remote binary language model is a reflection of a co-existence relationship between the two primary words, which often represents the relevant degree between the two primary words.

The ternary language model is configured to solve a ternary relationship between two keywords and one enter-on-screen candidate word, thus providing a prediction of the enter-on-screen candidate word based on the two keywords. The prediction relationship between the two keywords and the enter-on-screen candidate word may be a prediction of the enter-on-screen candidate word based on the two keywords in the above text information, a prediction of the enter-on-screen candidate word based on the two keywords in the below text information, or a prediction of the enter-on-screen candidate word based on one keyword in the above text information and one keyword in the below text information that sandwich the enter-on-screen candidate word. The prediction of the enter-on-screen candidate word using two keywords in the above text information may be, for example: "会议在晚上（召开）" (meaning "meeting (held) at night" in Chinese, where "会议" means "meeting", "在晚上" means "at night", and "(召开)" means "(held)"). In this example, "召开 (held)" is the enter-on-screen candidate word, "会议 (meeting)~召开 (held)" is a relatively distinct remote binary, and "召开 (held)", as the enter-on-screen candidate word, may rank top. Though the binary relationship in "在晚上 (at night)~召开 (held)" is also significant, the rank of "召开 (held)" as the enter-on-screen candidate word may be lower than a hundred, and if only based on the adjacent binary relationship in existing technologies, the enter-on-screen candidate word "召开 (held)" may be highly likely left out. Thus, a ternary language model "A~B~C" may be introduced for this case, where A represents a certain keyword in the remote above text information, B represents a nearby/adjacent keyword, and C represents the enter-on-screen candidate word, and a reliable enter-on-screen candidate word may be obtained. In another situation, if keywords "脚本 (script)" and "指南 guide)" are found to exist before and after the input cursor, respectively, then "脚本 (script)~学习 (learning)~指南 (guide)" may be utilized to predict the enter-on-screen candidate word "学习 (learning)".

2) The user model includes user binary model, user ternary model, and remote user binary model. In particular, the user binary model is configured to solve the user binary relationship existing between the previous user enter-on-screen and next user enter-on-screen. The user ternary model is configured to solve the user ternary relationship existing in three consecutive user enter-on-screens. The remote user binary model is configured to solve the remote binary relationship existing between the user enter-on-screen word within a certain distance and the current user enter-on-screen word. The user model is a model obtained based on the statistics of the user usage habit of the entries, and each model has a corresponding statistically counted associative candidate lexicon.

3) The perpendicular model includes a plurality of language models in the perpendicular field, and the plurality of language models are related to the classification of the fields that the entries belong to. In one example, the perpendicular model may be a system binary language model in a time-related field. For example, the associative candidate lexicon of the perpendicular model corresponding to "night" includes "9 o'clock, 10 o'clock, and 11 o'clock", and the associative candidate lexicon of the perpendicular model corresponding to "Saturday" includes "morning, and afternoon". The perpendicular model may also be a language model in a position-related field, for example, the associative candidate lexicon of the perpendicular model corresponding to "五道口 (Wudaokou, a neighborhood in Beijing)" includes "清华同方 (Tsinghua Tongfang, the name of a company near Wudaokou), 日昌 (Richang, the name of a restaurant near Wudaokou), 华联 (Hualian, the name of a building near Wudaokou)", etc. The perpendicular model further includes language models in a quantifier-related field, language models in a recommendation-related field, language models in an input app environment field, language models in a title-related or name-related field, and language models in a holiday-related blessing field. Each perpendicular model is a model obtained based on statistics of the field that the entry belongs to, and each model has a corresponding statistically counted associative candidate lexicon.

4) The common vocabulary language model (also called system vocabulary language model) is configured to cover a situation where an entity word is not completely inputted, thereby fulfilling a prediction on the suffix of the entire entry. The model is a model obtained based on statistics of common entries. For example, if the keyword in the above text information is "笑傲 (literal meaning 'laughing proudly')", then the enter-on-screen candidate word is "江湖 (literal meaning 'rivers and lake', where "笑傲江湖" together forms a name of a famous Chinese novel, sometimes translated as "The Smiling, Proud Wanderer")".

5) The situation model is a model established based on the topic situation that the keyword belongs to, such as a meeting situation, a dinning situation, etc. Each keyword may has one or a plurality of situation feature tags, each situation feature tag corresponds to one situation model, and each situation model has its own associative candidate lexicon.

After pre-establishing the above-described language model, Step 202 may be executed.

In Step 202, according to a distance relationship between the keywords and the input cursor and/or an application property that each keyword belongs to, the language models corresponding to the keywords may be determined.

In the present step, according to the distance relationship between the keywords and the input cursor, the systems model that the keywords correspond to may be determined. If one keyword is extracted, when the distance relationship between the keyword and the input cursor is an adjacent relationship, the language model corresponding to the determined keyword is determined to be an adjacent binary language model, and when the distance relationship is a non-adjacent relationship, the language model corresponding to the keyword is determined to be a remote binary language model. If two keywords are extracted, the language model corresponding to the keywords is determined to be a ternary language model.

The language models corresponding to the keywords may also be determined according to a certain application property that each keyword belongs to. For example, the user model corresponding to the keyword may be determined according to the user usage habit feature that the keyword belongs to. Or, the perpendicular model corresponding to the keyword may be determined according to the application field that the keyword belongs to. Or, the common vocabulary language model corresponding to the keyword may be determined according to the common vocabulary that the keyword belongs to. Or, the situation model corresponding to the keyword may be determined according to the topic situation that the keyword belongs to, etc.

A plurality of language models corresponding to the keyword may be determined simultaneously, such as a remote binary model, an adjacent binary model, a ternary model, a user binary model, and a common vocabulary language model, etc.

In Step 203, according to the associative candidate lexicons corresponding to the language models, the enter-on-screen word queue at the input cursor position is obtained.

For the system model, the user model, and the perpendicular model, to conveniently search through the associative candidate lexicon of the language model for the enter-on-screen candidate word queue, indexes such as a left element index and a right element index may be established in each associative candidate lexicon based on conventional methods. When the keyword is from the above text information, the left element index of the associative candidate lexicon of the language model may be utilized to search for the enter-on-screen candidate word queue at the input cursor position. When the keyword is from the lower text information, the right element index of the associative candidate lexicon of the language model may be utilized to search for the enter-on-screen candidate word queue at the input cursor position. When the keywords are from the above and below text information, respectively, search in the two directions may be performed. Further, the query using a central element as a searching goal may be introduced. Accordingly, two secondary indexes may be established in the associative candidate lexicon of the ternary model, such that the central element may be searched for in two directions. For the common vocabulary language model, similar to the existing associative method, the enter-on-screen candidate word queue at the input cursor position may be obtained using a prefix matching method.

Figure 4:
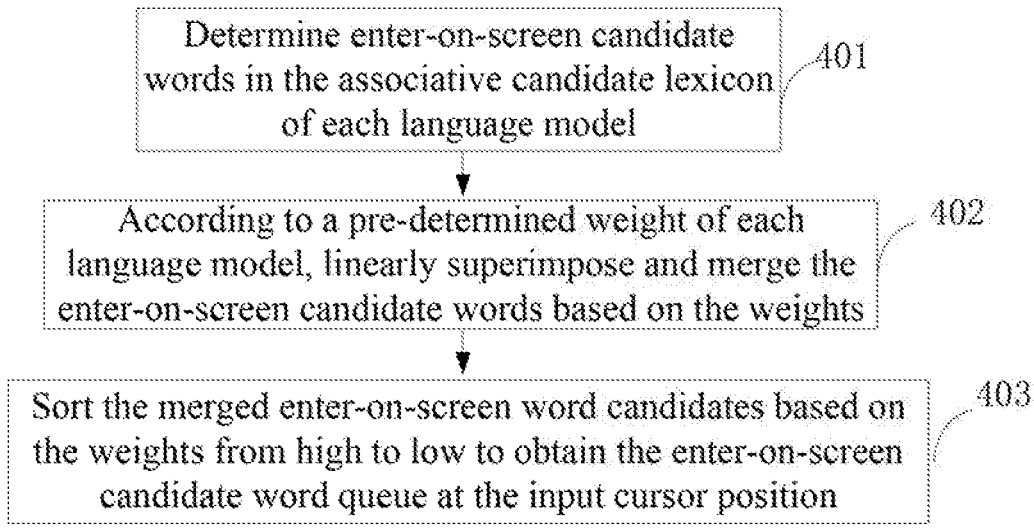
FIG. 4 illustrates a flow chart of a method for acquiring an enter-on-screen candidate word queue at an input cursor position according to an associative candidate lexicon corresponding to a language model in embodiments of the present disclosure.

When at least two language models are determined in the previous step, the process that obtains the enter-on-screen candidate word queue at the input cursor position is illustrated in FIG. 4, which further includes the following steps.

Step 401: the enter-on-screen candidate words in the associative candidate lexicon of each language model are determined.

Step 402: according to the pre-determined weight of each language model, the enter-on-screen candidate words are linearly superimposed and merged based on the weights.

Step 403: the merged enter-on-screen candidate words based on the weights from high to low are sorted to obtain the enter-on-screen candidate word queue at the input cursor position.

By combining the plurality of language models corresponding to the keywords, a more ideal and reliable enter-on-screen candidate word queue may be obtained. For example, the text information at the input cursor position may be "明天我到大连, 我想去发现[光标] (meaning "tomorrow I will arrive at Dalian, I want to find [cursor]")", and the input intent of the user is that he wants to find a playground named "王国 (Kingdom)". The keywords "大连 (Dalian)" and "发现 (find)" in the above text information are extracted. In particular, the keyword "大连 (Dalian)" points out the location of the user destination, thereby belonging to the perpendicular model. Further, combined with the keyword "发现 (find)", the reliable enter-on-screen candidate word "王国 (Kingdom)" may be obtained.

In another embodiment of the present disclosure, after the enter-on-screen candidate word queue is obtained based on the above-described method, the enter-on-screen candidate word queue may be directly outputted for the user to select. Or, before being outputted, the enter-on-screen candidate word queue may be re-ordered, and the re-ordered enter-on-screen candidate word queue may then be outputted.

Figure 5:
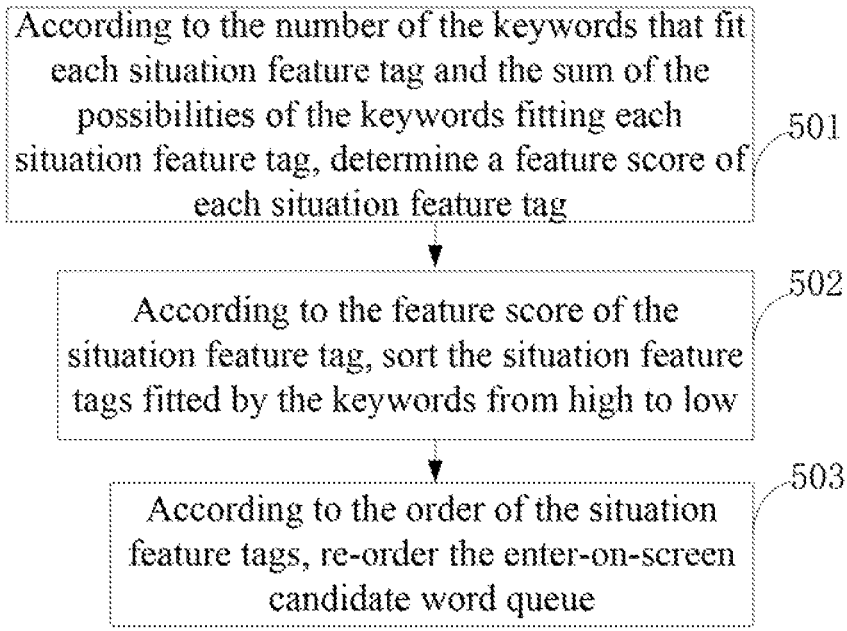
FIG. 5 illustrate a flow chart of a method for re-ordering an enter-on-screen candidate word queue according to a topic situation at an input cursor position in embodiments of the present disclosure.

A plurality of re-ordering methods are available, and one method that re-orders the enter-on-screen candidate word queue according to the topic situation at the input cursor position is illustrated in FIG. 5, which may include:

Step 501, according to the number of the keywords that fit each situation feature tag and the sum of possibilities of the keywords fitting each situation feature tag, determining a feature score of each situation feature tag.

Each keyword may fit one or a plurality of situation feature tags, each situation feature tag corresponds to one topic situation, and the possibility of the keyword fitting a certain situation feature tag in the ultimate enter-on-screen result may be obtained according to statistics. Accordingly, the feature score $feature_i$ of each situation feature tag i may be represented as:

$$feature_i = N_i \times \sum_{j=1}^{N_i} word_j,$$

where $N_i$ is the number of keywords fitting the situation feature tag i, $word_j$ is the possibility that a $j^{th}$ keyword fitting the situation feature tag i in the ultimate enter-on-screen result, and j=1, 2, . . . , $N_i$.

Step 502: according to the feature score of each situation feature tag, the situation feature tags are sorted from high to low.

The topic situation corresponding to the situation feature tag with a higher score may be the topic situation that the ultimate enter-on-screen word belongs to.

Step 503: the enter-on-screen candidate word queue is re-ordered according to the order of the situation feature tags.

After obtaining the enter-on-screen candidate word queue according to the order of the situation feature tags, the enter-on-screen candidate words in the enter-on-screen candidate word queue may each has its own situation feature tag. In the present step, the enter-on-screen candidate words may be re-ordered according to the order of the situation feature tags, thereby obtaining the ultimate enter-on-screen candidate word queue.

Embodiments of the present disclosure combines a situation sensing function and ranks top the ideal candidate by re-ordering the enter-on-screen candidate words, thereby providing a more reliable enter-on-screen candidate word queue.

Hereinafter, specific embodiments are utilized for illustrative purpose.

For example, the text information at the input cursor position may be "我们安排 在花园酒店, 在晚上[光标] 盛大的宴会 (meaning: we plan to [cursor] a grand party in the garden hotel at night, where "我们" means "we", "安排" means "plan to", "在" means "at or in, etc.", "花园" means "garden", "酒店" means "hotel", "晚上" means "night", "光标" means "[cursor]", "盛大的" means "grand", and "宴会" means "party")". Based on the method in embodiments of the present disclosure, keywords "安排 (plan to)", "花园 (garden)", "酒店 (hotel)", "晚上 (night)", "盛大 (grand)", and "宴会 (party)" are extracted from the text information. According to the distance relationship between the keywords and the input cursor, the language models corresponding to the keywords may be determined to be adjacent binary models, remote binary models, and ternary models. The enter-on-screen candidate word queue at the input cursor position obtained according to the associative candidate lexicons corresponding to the language models may be: (晚上) 睡觉, meaning (night) sleep; (晚上) 约会, meaning (night) date; 举行(宴会), meaning hold (party); (安排) 发货, meaning (plan to) dispatch; (花园) 门口, meaning (garden) door; and (晚上) 举行 (宴会), meaning (night) hold (party). The ultimate enter-on-screen candidate word queue obtained after re-ordering the enter-on-screen candidate word queue may be: 举行 (hold), 睡觉 (sleep), 约会 (date), 门口 (door), and 发货 (dispatch).

In the above example, two technical points support the occurrence of the enter-on-screen word "举行 (hold)", including: first, the support of the understanding of the below text information after the input cursor, and second, the support of a process that triggers the enter-on-screen candidate word remotely. A certain binary relationship exists between "在晚上 (at night)" and "举行 (hold)", but the relationship is very weak, and a normal associative prediction result that brings forward this example may be slightly unexpected. In the below text information after the input cursor, the text right after the input cursor is "盛大 (grand)", which cannot make any contribution to the prediction of the candidate "举行 (hold)". However, "举行~宴会 (hold-~party)" is a strong remote binary language model, which has a vital importance on the prediction of the candidate "举行 (hold)".

Further, for example, the text information at the input cursor position is "去年中 秋去了韩国, 今年想去[光标]] (meaning: went to Korea last autumn festival, this year want to go to [cursor], where "去年中秋" means "last autumn festival", "去了" means "went", "韩国" means "Korea", "今年" means "this year", and "想去" means "want to go to"), and the input intent of the user is to enter "日本 (Japan)" on screen. Because the position of the input cursor is located is right after "想去 (want to go to)", according to the conventional associative strategies, "去 (go to)" and "想去 (want to go to)" may be utilized to perform search of the enter-on-screen candidate word. Based on the method in embodiments of the present disclosure, "韩国 (Korea)" and "日本 (Japan)" are an extracted associative candidate lexicon of the remote binary language model, and "去 (go to)" and "日本 (Japan)" are an extracted associative candidate lexicon of the adjacent binary language model. Under the cooperative effect of the remote binary language model and adjacent binary language model, the enter-on-screen candidate word "日本 (Japan)" may rank top in the enter-on-screen candidate word queue, and similar candidate words may include "泰国 (Thailaan)", and "新加坡 (Singapore)".

Further, for example, if the keyword of the above text information is "晚上 (night)", then according to the perpendicular model in the field of time corresponding to the keyword and the user model, the current system time and the time data once entered on screen in the user input history may be utilized to perform prediction. For example, the enter-on-screen candidate word queue may be provided as {10 o'clock, 9 o'clock, and 11 o'clock}. If the user choose a specific enter-on-screen candidate word in {10 o'clock, 9 o'clock, and 11 o'clock}, the enter-on-screen candidate word queue of {half, quarter, three quarters} may be subsequently outputted.

Further, for example, if the keyword of the above text information is "五道口 (Wudaokou)", then according to the perpendicular model in the geological field corresponding to the keyword and the user model, the geographic name input historic data in the user input history and the instantly obtained location information may be utilized to provide nearby and related geographic location names as the enter-on-screen candidate word queue, such as {清华同方 (Qinghua Tongfang), 日昌 (Richang), 华联 (Hualian)}. That is, in the method, after the user inputs "五道口 (Wudaokou)", other than "城铁 (Chengtie)", the enter-on-screen candidate words provided by the system may include "清华同方 (Qinghua Tongfang)", which lights up the user's eyes.

Further, for example, a user wants to express a meaning of "故都的秋 (meaning "autumn in hometown" in Chinese)" and the input of the first three words has been completed, a plurality of the user enter-on-screen forms may be found, such as "故都～的", "秋～故～都～的～秋", and "故都的～秋". In this case, though association is performed on the same enter-on-screen candidate word "秋 (autumn)", the information lastly entered on screen may vary a lot, and the last sentence-breaking method inputted by the user may be the only way to predict out the candidate word "秋 (autumn)". However, according to the method of the present disclosure, by extracting the keyword "故都 (hometown)" and further referring to the language model corresponding to the keyword "故都 (hometown)", such as the common vocabulary language model, the enter-on-screen candidate word "秋 (autumn)" is obtained.

The method disclosed by the above-described embodiments may be used to more fully and correctly understand the user input intent. The above-described embodiments may not only be applied to Chinese input scenes, but may also be applied to other language input scenes such as English, Japanese, and Korean, etc.

It should be noted that, for the method embodiments, they are expressed as a series of action combination for ease of description. But those skilled in the art should also understand that embodiments of the present disclosure are not limited to the described order of actions, because according to embodiments of the present disclosure, certain steps may be performed using other orders or may be performed simultaneously. Further, those skilled in the art should also understand that, embodiments described in the specification all belong to preferred embodiments, and the actions mentioned may not be necessarily needed in the embodiments of the present disclosure.

Figure 6:
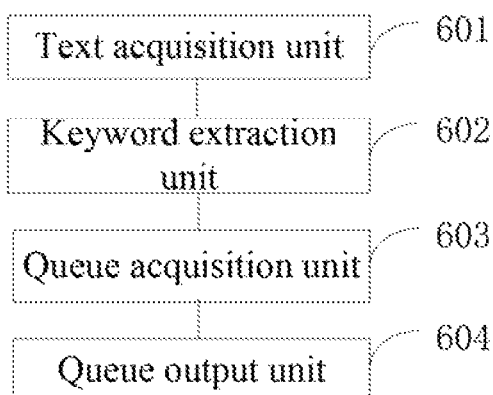
FIG. 6 illustrate a structural schematic view of an input device in embodiments of the present disclosure.

Referring to FIG. 6, a structural schematic view of an input device in embodiments of the present disclosure is provided.

The device may include the following units.

A text acquisition unit 601, configured to acquire text information at an input cursor position. The text information includes above text information located before the input cursor and/or below text information located after the input curser.

A keyword extraction unit 602, configured to extract keywords from the text information.

A queue acquisition unit 603, configured to search through the associative candidate lexicons of the keywords to obtain an enter-on-screen candidate word queue at the input cursor position.

A queue output unit 604, configured to output the enter-on-screen candidate word queue.

By acquiring the text information at the input cursor position and determining the enter-on-screen candidate word queue based on the keyword in the text information, the device may solve the issue in existing techniques that after the input cursor changes its position, no enter-on-screen candidate word may be provided by association because no reliable enter-on-screen entry is obtained. The disclosed device not only acquires reliable enter-on-screen candidate words when the input cursor moves. Further, instead of simply relying on the entry lastly entered on screen to provide the enter-on-screen candidate word queue via association, the device may utilize the text information before and after the input cursor as well as the remote text information to provide the enter-on-screen candidate word queue via association. The device may more fully and correctly understand the input intend of the user, thereby providing a more reliable enter-on-screen candidate word queue.

In another embodiment of the present disclosure, the text acquisition unit 601 may specifically be configured to when the input cursor is detected to be located inside the text box and the stop duration of text input exceeds the time threshold, acquire the text information at the input cursor position. The text acquisition unit 601 may further specifically be configured to use the break point of the whole sentence where the input cursor is located or the text box boundary as the length boundary of the text information to acquire the text information at the input cursor position.

Figure 7:
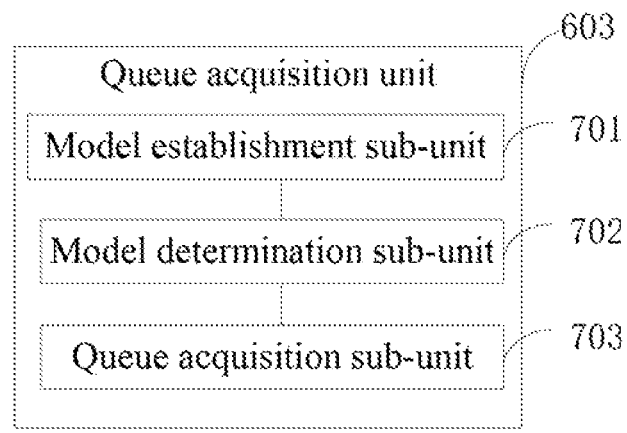
FIG. 7 illustrates a structural schematic view of a queue acquisition unit in embodiments of the present disclosure.

In another embodiment of the present disclosure, as illustrated in FIG. 7, the queue acquisition unit 603 may further include:

a model establishment sub-unit 701, configured to before a model determination sub-unit 702 determines the language models corresponding to the keywords, establish the language models and the associative candidate lexicons of the language models. The language models include the adjacent binary language model, the remote binary language model, and the ternary language model.

The queue acquisition unit 603 further includes the model determination sub-unit 702, configured to according to the distance relationship between the keywords and the input cursor and/or the application property that each keyword belongs to, determine the language models corresponding to the keywords.

The queue acquisition unit 603 further include a queue acquisition sub-unit 703, configured to search through the associative candidate lexicons of the language models to obtain the enter-on-screen candidate word queue at the input cursor position.

Figure 8:
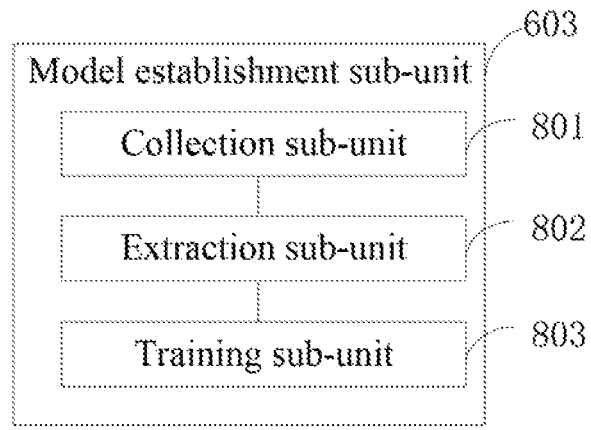
FIG. 8 illustrates a structural schematic view of a model establishment sub-unit in embodiments of the present disclosure.

In particular, as illustrated in FIG. 8, the model establishment sub-unit 701 may further include:

a collection sub-unit 801, configured to collect a training corpus;

an extraction sub-unit 802, configured to extract a training candidate word and training keywords from the training corpus, where the distance relationship between the training keywords and the training candidate word includes an adjacent relationship and a non-adjacent relationship, and the number of training keywords is at least one; and a training sub-unit 803, configured to perform model training on the training candidate word and the training keywords to obtain the language models and the associative candidate lexicons of the language models.

In particular, the model determination sub-unit 702 is specifically configured to, if the number of the keywords is one, when the distance relationship between the keyword and the input cursor is the adjacent relationship, determine the language model corresponding to the keyword as the adjacent binary language model. Further, when the distance relationship is the non-adjacent relationship, the language model corresponding to the keyword is determined to be the remote binary language model. If the number of the keywords is two, the language model corresponding to the keyword is determined to be the ternary language model.

The model determination sub-unit 702 may further be configured to according to the user usage habit feature that the keyword belongs to, determine the user model corresponding to the keyword; or, according to the application field that the keyword belongs to, determine the perpendicular model corresponding to the keyword; or, according to the common vocabulary that the keyword belongs to, determine the common vocabulary language model corresponding to the keyword; or, according to the topic situation that the keyword belongs to, determine the situation model corresponding to the keyword.

Figure 9:
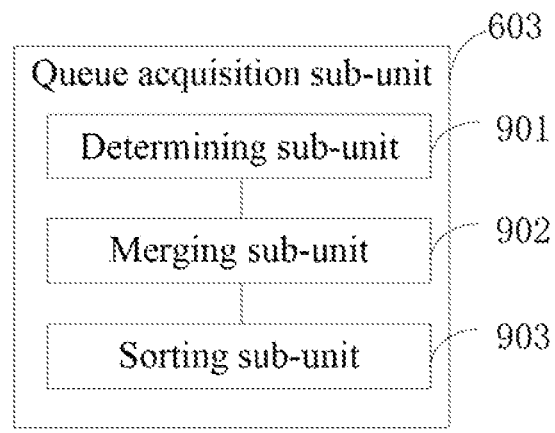
FIG. 9 illustrates a structural schematic view of a queue acquisition sub-unit in embodiments of the present disclosure.

As shown in FIG. 9, the queue acquisition sub-unit 703 may further include:

a determination sub-unit 901, configured to when the number of the language models is at least two, determine the enter-on-screen candidate words in the associative candidate lexicon of each language model, respectively;

a merging sub-unit 902, configured to according to the pre-determined weight of each language model, linearly superimpose and merge the enter-on-screen candidate words based on the weights; and a sorting sub-unit 903, configured to sort the merged enter-on-screen candidate words based on the weights from high to low to obtain the enter-on-screen candidate word queue at the input cursor position.

Figure 10:
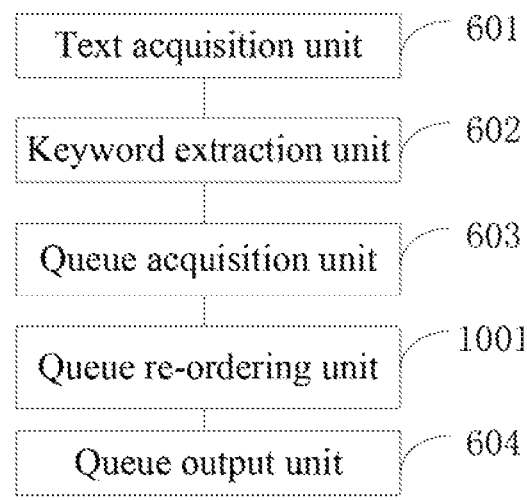
FIG. 10 illustrates a structural schematic view of another input device in embodiments of the present disclosure.

Referring to FIG. 10, a structural schematic view of another input device in embodiments of the present disclosure is illustrated.

Other than including the above-described text acquisition unit 601, the keyword extraction unit 602, the queue acquisition unit 603, the queue output unit 604, the device further includes:

a queue re-ordering unit 1001, configured to before the queue output unit 604 outputs the above-described enter-on-screen candidate word queue, re-ordering the above-described enter-on-screen candidate word queue according to the topic situation at the input cursor position.

The queue output unit 604 is configured to output the re-ordered enter-on-screen candidate word queue.

Figure 11:
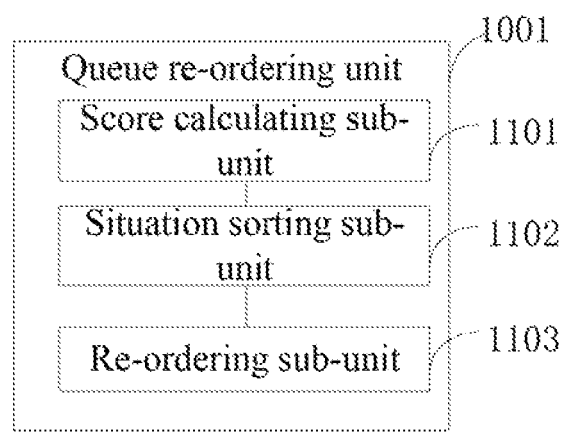
FIG. 11 illustrates a structural schematic view of a queue re-ordering unit in embodiments of the present disclosure.

In particular, as shown in FIG. 11, the queue re-ordering unit 1001 may further include:

a score calculating sub-unit 1101, configured to according to the number of the keywords that fit each situation feature tag and the sum of possibilities of the keywords ting each situation feature tag, determine the feature score of each situation feature tag;

a situation sorting sub-unit 1102, configured to according to the feature score of each situation feature tag, sorting the situation feature tags from high to low; and a re-ordering sub-unit 1103, configured to according to the order of the situation feature tags, re-ordering the enter-on-screen candidate word queue, where the enter-on-screen candidate words in the enter-on-screen candidate word queue each its own situation feature tag.

The device integrates a situation sensing function, and by sorting and re-ordering the enter-on-screen candidate words, the ideal candidate word is ranked top, and a more reliable enter-on-screen candidate word queue is provided.

Embodiments of the present disclosure also provide an electronic apparatus, including a memory and a processor. The memory is configured to store computer instructions or codes, the processor is coupled to the memory and configured to execute the computer instructions or codes in the memory, thus implementing the following method:

acquiring the text information at the input cursor position, the text information includes the above text information located before the input cursor and/or the below text information located after the input cursor;

extracting the keywords from the text information;

searching through the associative candidate lexicons of the keywords to obtain the enter-on-screen candidate word queue at the input cursor position; and outputting the enter-on-screen candidate word queue.

The present disclosure also discloses a computer program including computer-readable codes. When the computer-readable codes run at a mobile terminal, the mobile terminal may execute the above-described input method.

A computer-readable recording medium is used to record the above-described computer program configured to execute the disclosed input method. The computer-readable recording medium includes any mechanism configured to store or send information in a machine (e.g., computer) readable form. For example, a machine-readable medium includes read-only memory (ROM), random access memory (RAM), magnetic disc storage medium, optical storage medium, flash storage medium, and electrical, optical, acoustic or other forms of propagated signals (e.g., carrier waves, infrared signals, digital signals, etc.), etc.

For device embodiments, because they are similar to the method embodiments, the descriptions are relatively simple, and related portions may refer to a part of illustrations in the method embodiments.

Various embodiments of the present specification are described in a progressive manner, each embodiment highlights its difference from other embodiments, and similar parts between each embodiment can be referred to each other.

Those skilled in the art should understand that the embodiments of the present disclosure may provide methods, devices, or computer program products. Accordingly, embodiments of the present disclosure may adopt entire hardware embodiments, entire software embodiments, or a form combining software embodiments and hardware embodiments. Further, embodiments of the present disclosure may adopt a form of computer program products implemented in one or more computer-readable storage media (including but not limited to magnetic disc storage, CD-ROM, optical storage, etc.) including computer-readable program codes.

Aspects of the present disclosure are described with reference to flowcharts and block diagrams of the methods, terminal units (systems) and computer program products according to embodiments of the present disclosure. It should be understood that computer program instructions may implement each process and/or block in the flowcharts and/or block diagrams, and combinations of process and/or block in the flowcharts and/or the block diagrams. These computer program instructions may be provided to a processor of a general purpose computer, special purpose computer, or other programmable data processing terminal device to produce a machine, such that the instructions, which are executed via the processor of the computer or other programmable data processing terminal unit, creates means for implementing functions specified in one process or a plurality of processes in the flowcharts and/or one block or a plurality of blocks in the block diagrams.

These computer program instructions may also be stored in computer-readable medium that can direct a computer or other programmable data processing terminal devices in a particular manner, such that the instructions stored in the computer-readable medium produce an article of manufacture including an instructional device. The instructional device implements functions specified in one process or a plurality of processes in the flowcharts and/or one block or a plurality of blocks in the block diagrams.

The computer program instructions may also be loaded onto a computer, or other programmable data processing terminal units, such that the computer or other programmable terminal units execute a series of operational steps to produce a computer implemented process, such that the instructions executed in the computer or other programmable terminal units provide processes for implementing the functions specified in one process or a plurality of processes in the flowcharts and/or one block or a plurality of blocks in the block diagrams.

Though the preferred embodiments of the present disclosure are described, those skilled in the art can make additional alterations and modifications to these embodiments in case of knowing the basic creative concepts. Therefore, the appended claims intend to be defined as including the preferred embodiments as well as all of the alterations and modifications falling into the scope of the present disclosure.

Last, it should be noted that, in this document, relational terms such as first and second, and the like may be used solely to distinguish one entity or operation from another entity or operation without necessarily requiring or implying any actual such relationship or order between such entities or operations. Further, terms "including", "comprising", or any other variation thereof are intended to cover a non-exclusive inclusion, such that a process, method, article or terminal device that comprises a list of elements does not include only those elements but may include other elements not expressly listed or inherent to such process, method, article, or terminal device. An element proceeded by "comprises . . . a" does not, without more constraints, preclude the existence of additional identical elements in the process, method, article, or terminal device that comprises the element.

Above is detailed description of an input method, device and electronic apparatus provided by the present disclosure. Specific embodiments are applied in the document to illustrate principles and implementation methods of the present disclosure. Illustrations of the above-described embodiments are only used to help understand the method and core idea of the present disclosure. Meanwhile, those ordinarily skilled in the art may, according to the spirit of the present disclosure, make changes to specific embodiments and application scope. As such, the content of the specification should not be understood to be limiting of the present disclosure.

What is claimed is:

1. An input method, comprising:
acquiring, by an input method application, text information at an input cursor position, the text information including at least one of above text information located before the input cursor or below text information located after the input cursor, wherein the text information includes a text other than an entry lastly entered on screen by the input method application;
extracting, by the input method application, one or more keywords from the text information;
searching, by the input method application, through associative candidate lexicons of the one or more keywords to obtain an enter-on-screen candidate word queue at the input cursor position, including:
when language models are of a number of at least two, determining enter-on-screen candidate words in associative candidate lexicons of the language models;
according to pre-determined weights of the language models, linearly superimposing and merging the enter-on-screen candidate words based on the pre-determined weights;
sorting a merged enter-on-screen candidate word based on the pre-determined weights from high to low to obtain the enter-on-screen candidate word queue at the input cursor position;
according to at least one of a distance relationship between the one or more keywords and the input cursor or an application property that each keyword belongs to, determining the language models corresponding to the one or more keywords, wherein the distance relationship indicates whether the input cursor is located adjacent to the one or more keywords, and wherein the language models are determined to include an adjacent binary language model when the input cursor is located adjacent to the one or more keywords, and to include a remote binary language model when the input cursor is located non-adjacent to the one or more keywords; and
searching through associative candidate lexicons of the language models to obtain the enter-on-screen candidate word queue at the input cursor position; and
outputting, by the input method application, the enter-on-screen candidate word queue.

2. The method according to claim 1, wherein acquiring the text information at the input cursor position comprises:
when the input cursor position is detected to be inside a text box and a stop duration of text input exceeds a time threshold, acquiring the text information at the input cursor position.

3. The method according to claim 1, wherein acquiring the text information at the input cursor position comprises:
using a break point of a whole sentence where the input cursor is located or a text box boundary as a length boundary of the text information to acquire the text information at the input cursor position.

4. The method according to claim 1, wherein the language models are determined to include
a ternary language model when the one or more keywords are of a number of two.

5. The method according to claim 4, wherein before according to the distance relationship between the keywords and the input cursor, determining the language models corresponding to the keywords, the method further comprising:
establishing the language models and associative candidate lexicons of the language models, wherein the language models include the adjacent binary language model, the remote binary language model and the ternary language model;
wherein establishing the language models and the associative candidate lexicons includes:
collecting a training corpus;
extracting a training candidate word and training keywords from the training corpus, wherein the distance relationship between the training keywords and the training candidate word includes an adjacent relationship and a non-adjacent relationship, and a number of the training keywords is at least one; and
performing model training on the training candidate word and the training keywords, thereby obtaining the language models and the associative candidate lexicons of the language models.

6. The method according to claim 4, wherein:
the adjacent relationship refers to a relationship where no intervals or only stop-word exist between the keyword and the input cursor.

7. The method according to claim 1, wherein determining the language models corresponding to the keywords according to the application property that each keyword belongs to, comprises:
according to a user usage habitat feature that the keyword belongs to, determining a user model corresponding to the keyword; or
according to an application field that the keyword belongs to, determining a perpendicular model corresponding to the keyword; or
according to a common vocabulary that the keyword belongs to, determining a common vocabulary language model corresponding to the keyword; or
according to a topic situation that the keyword belongs to, determining a situation model corresponding to the keyword.

8. The method according to claim 1, wherein before outputting the enter-on-screen candidate word queue, the input method further comprises:
according to a topic situation at the input cursor position, re-ordering the enter-on-screen candidate word queue; and
outputting the enter-on-screen candidate word queue includes:
outputting a re-ordered enter-on-screen candidate word queue.

9. The method according to claim 8, wherein according to the topic situation at the input cursor position, re-ordering the enter-on-screen candidate word queue comprises:
according to a number of the keywords that fit each situation feature tag and a sum of possibilities of the keywords fitting each situation feature tag, determining a feature score of each situation feature tag;
according to a feature score of each situation feature tag, sorting the situation feature tags from high to low; and
according to an order of the situation feature tags, re-ordering the enter-on-screen candidate word queue, wherein the enter-on-screen candidate words in the enter-on-screen candidate word queue have each own situation feature tag.

10. The method according to claim 1, wherein:
when the text information is acquired, the input cursor position is not at a position corresponding to the entry lastly entered on screen by the input method application.

11. An input device, comprising at least one processor, the at least one processor being configured for:
acquiring, by an input method application, text information at an input cursor position, the text information including at least one of above text information located before the input cursor or below text information located after the input cursor, wherein the text information includes a text other than an entry lastly entered on screen by the input method application;
extracting, by the input method application, one or more keywords from the text information;
searching, by the input method application, through associative candidate lexicons of the one or more keywords to obtain an enter-on-screen candidate word queue at the input cursor position, including:
when language models are of a number of at least two, determining enter-on-screen candidate words in associative candidate lexicons of the language models;
according to pre-determined weights of the language models, linearly superimposing and merging the enter-on-screen candidate words based on the pre-determined weights;
sorting a merged enter-on-screen candidate word based on the pre-determined weights from high to low to obtain the enter-on-screen candidate word queue at the input cursor position;
according to at least one of a distance relationship between the one or more keywords and the input cursor or an application property that each keyword belongs to, determining the language models corresponding to the one or more keywords, wherein the distance relationship indicates whether the input cursor is located adjacent to the one or more keywords, and wherein the language models are determined to include an adjacent binary language model when the input cursor is located adjacent to the one or more keywords, and to include a remote binary language model when the input cursor is located non-adjacent to the one or more keywords; and
searching through associative candidate lexicons of the language models to obtain the enter-on-screen candidate word queue at the input cursor position; and
outputting, by the input method application, the enter-on-screen candidate word queue.

12. The device according to claim 11, wherein the at least one processor is further configured for:
when the input cursor is detected to be inside a text box and a stop duration of text input exceeds a time threshold, acquiring the text information at the input cursor position.

13. The device according to claim 11, wherein the at least one processor is further configured for:
using a break point of a whole sentence where the input cursor is located or a text box boundary as a length boundary of the text information, and
acquiring the text information at the input cursor position.

14. The device according to claim 11, wherein the at least one processor is further configured for:
  determining that the language models include a ternary language model when the one or more keywords are of a number of two.

15. The device according to claim 14, wherein the at least one processor is further configured for:
  determining the language models corresponding to the keywords, establishing the language models and the associative candidate lexicons of the language models, wherein the language models include the adjacent binary language model, the remote binary language model, and the ternary language model;
  collecting a training corpus;
  extracting a training candidate word and training keywords from the training corpus, wherein the distance relationship between the training keywords and the training candidate includes an adjacent relationship and a non-adjacent relationship, and a number of the training keywords is at least one; and
  performing model training on the training candidate word and the training keywords to obtain the language models and the associative candidate lexicons of the language models.

16. The device according to claim 11, wherein the at least one processor is further configured for:
  according to a user usage habitat feature that the keyword belongs to, determining a use model corresponding to the keyword; or, according to an application field that the keyword belongs to, determining a perpendicular model corresponding to the keyword; or, according to a common vocabulary that the keyword belongs to, determining a common vocabulary language model corresponding to the keyword; or, according to a topic situation that the keyword belongs to, determining a situation model corresponding to the keyword.

17. The device according to claim 11, wherein the at least one processor is further configured for:
  before outputting the enter-on-screen candidate word queue, according to a topic situation at the input cursor position, re-ordering the enter-on-screen candidate word queue;
  outputting a re-ordered enter-on-screen candidate word queue;
  according to a number of the keywords that fit each situation feature tag and the sum of possibilities of the keywords fitting each situation feature tag, determining a feature score of each situation feature tag;
  according to the feature score of each situation feature tag, sorting the situation feature tags from high to low; and
  according to an order of the situation feature tag, re-ordering the enter-on-screen candidate word queue, wherein the enter-on-screen candidate words in the enter-on-screen candidate word queue have each own situation feature tag.

18. An electronic apparatus, comprising a memory and a processor, wherein the memory is configured to store computer instructions or codes, the processor is coupled to the memory and configured to execute computer instructions or codes in the memory, thereby implementing a following method:
  acquiring, by an input method application, text information at an input cursor position, the text information including at least one of above text information located before the input cursor or below text information located after the input cursor, wherein the text information includes a text other than an entry lastly entered on screen by the input method application;
  extracting, by the input method application, one or more keywords from the text information;
  searching, by the input method application, through associative candidate lexicons of the one or more keywords to obtain an enter-on-screen candidate word queue at the input cursor position, including:
    when language models are of a number of at least two, determining enter-on-screen candidate words in associative candidate lexicons of the language models;
    according to pre-determined weights of the language models, linearly superimposing and merging the enter-on-screen candidate words based on the pre-determined weights;
    sorting a merged enter-on-screen candidate word based on the pre-determined weights from high to low to obtain the enter-on-screen candidate word queue at the input cursor position;
    according to at least one of a distance relationship between the one or more keywords and the input cursor or an application property that each keyword belongs to, determining the language models corresponding to the one or more keywords, wherein the distance relationship indicates whether the input cursor is located adjacent to the one or more keywords, and wherein the language models are determined to include an adjacent binary language model when the input cursor is located adjacent to the one or more keywords, and to include a remote binary language model when the input cursor is located non-adjacent to the one or more keywords; and
    searching through associative candidate lexicons of the language models to obtain the enter-on-screen candidate word queue at the input cursor position; and
  outputting, by the input method application, the enter-on-screen candidate word queue.

* * * * *